(12) United States Patent
Vinokour et al.

(10) Patent No.: US 8,218,437 B2
(45) Date of Patent: Jul. 10, 2012

(54) SHARED SHAPING OF NETWORK TRAFFIC

(75) Inventors: Vitali Vinokour, Arlington, MA (US); Shawn Gallagher, Chelmsford, MA (US); Daniel K. Siu, Westford, MA (US); Thomas A. Lemaire, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/771,916

(22) Filed: Apr. 30, 2010

(65) Prior Publication Data
US 2010/0208588 A1  Aug. 19, 2010

Related U.S. Application Data

(63) Continuation of application No. 11/206,786, filed on Aug. 19, 2005, now Pat. No. 7,738,375.

(51) Int. Cl.
*H04J 3/14* (2006.01)
(52) U.S. Cl. ............. 370/230; 370/235
(58) Field of Classification Search .......... 370/432, 370/395.41, 235, 395.1, 230; 455/452.2, 455/522
See application file for complete search history.

(56) References Cited

U.S. PATENT DOCUMENTS

| | | | |
|---|---|---|---|
| 6,064,651 A | 5/2000 | Rogers et al. | |
| 6,104,698 A | 8/2000 | Fan et al. | |
| 6,438,138 B1 | 8/2002 | Kamiya | |
| 6,549,517 B1 | 4/2003 | Aweya et al. | |
| 6,636,512 B1 | 10/2003 | Lorrain et al. | |
| 6,687,225 B1 | 2/2004 | Kawarai et al. | |
| 6,973,315 B1 * | 12/2005 | Miernik et al. | 455/452.2 |
| 7,039,013 B2 * | 5/2006 | Ruutu et al. | 370/235 |
| 7,266,122 B1 * | 9/2007 | Hogg et al. | 370/395.41 |
| 2002/0110139 A1 * | 8/2002 | Boura et al. | 370/432 |
| 2002/0114334 A1 * | 8/2002 | Yang | 370/395.1 |
| 2003/0063562 A1 * | 4/2003 | Sarkinen et al. | 370/230 |
| 2004/0018849 A1 * | 1/2004 | Schiff | 455/522 |
| 2004/0081093 A1 | 4/2004 | Haddock et al. | |
| 2004/0085964 A1 | 5/2004 | Vaananen | |
| 2004/0114520 A1 | 6/2004 | Davis | |
| 2005/0044206 A1 | 2/2005 | Johansson et al. | |
| 2006/0014544 A1 | 1/2006 | Tolli | |
| 2006/0018326 A1 | 1/2006 | Yucel | |
| 2006/0164989 A1 | 7/2006 | Hart et al. | |

OTHER PUBLICATIONS

Co-pending U.S. Appl. No. 11/206,786, filed Aug. 19, 2005 entitled "Shared Shaping of Netowrk Traffic" by Vitali Vinokour et al., 25 pages.

* cited by examiner

*Primary Examiner* — Kwang B Yao
*Assistant Examiner* — Syed M Bokhari
(74) *Attorney, Agent, or Firm* — Harrity & Harrity, LLP

(57) ABSTRACT

A method for sharing an aggregate bandwidth among a group of traffic classes may include allocating a portion of the aggregate bandwidth to one of the group of traffic classes having a first priority associated therewith, where the allocated portion is referred to as a first bandwidth. The method may include allocating an unused portion of the aggregate bandwidth to a second one of the group of traffic classes having a second priority associated therewith in conjunction with a parameter associated with a downstream device.

17 Claims, 3 Drawing Sheets

SHARED SHAPING OF NETWORK TRAFFIC

RELATED APPLICATION

This application is a continuation of U.S. patent application Ser. No. 11/206,786 filed Aug. 19, 2005, which is incorporated herein by reference.

TECHNICAL FIELD

Implementations consistent with the principles of the invention relate generally to network communication and, more particularly, to sharing bandwidth among different priorities or classes of network traffic.

BACKGROUND

Service providers may configure networks to deliver network traffic over a path having a bandwidth. Service providers may want to configure networks to efficiently use the available bandwidth to meet the needs of their subscribers. For example, a subscriber may send different types, or classes, of traffic across a network, such as voice traffic, video traffic and/or data traffic. The subscriber may require that various classes of traffic be handled differently. In the above example, voice traffic may be prone to distortion when delayed between a sending device and a receiving device. In contrast, data traffic may be relatively insensitive to delay. As a result, a subscriber may wish to have voice traffic treated with a higher priority as compared to data traffic.

Service providers may configure networks to treat classes of traffic according to differing delivery requirements to facilitate efficient utilization of bandwidth. For example, service providers may configure networks to assign a best effort or a lower priority to data traffic and a higher priority to time-sensitive traffic, such as voice and/or video traffic.

Service providers may configure network devices to facilitate efficient traffic management in networks. For example, a network device may be configured to implement a scheduler to schedule the forwarding of traffic via logical interfaces according to the traffic's associated priority. A logical interface may be, for example, a virtual circuit (VC). The service provider may allocate bandwidth on the logical interface based on an anticipated volume for each class of traffic, such as, for example, voice, video, and/or data classes. A scheduler may try to shape traffic so as to ensure that no traffic class exceeds its portion of the overall bandwidth for the VC. This type of traffic shaping may cause the allocated bandwidth to be underutilized if a class of traffic, such as voice, is operating below its allocated threshold.

SUMMARY OF THE INVENTION

In accordance with an implementation, a method for sharing an aggregate bandwidth among a group of traffic classes is provided. The method may include allocating a portion of the aggregate bandwidth to one of the group of traffic classes having a first priority associated therewith, where the allocated portion is referred to as a first bandwidth. The method may include allocating an unused portion of the aggregate bandwidth to a second one of the group of traffic classes having a second priority associated therewith in conjunction with a parameter associated with a downstream device.

In accordance with another implementation, a device for implementing shared shaping is provided. The device may include a processor adapted to determine a new best effort rate value in association with rate information associated with a group of traffic classes, a best effort rate value, and a shared shaping rate. The processor may be adapted to shape an aggregate traffic flow that includes the group of traffic classes, where shaping the aggregate traffic flow operates to discourage exceeding a rate limit.

In accordance with yet another implementation, a device for shared shaping is provided. The device may include means for storing information about a group of traffic classes, a prior downstream queue length approximation, and a prior best effort rate value. The shared shaper may include means for shaping an aggregate traffic flow that includes the group of traffic classes based at least in part on the new best effort rate, where the shaped aggregate traffic flow is adapted to discourage overrunning a downstream queue.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims.

Exemplary System

Figure 1:
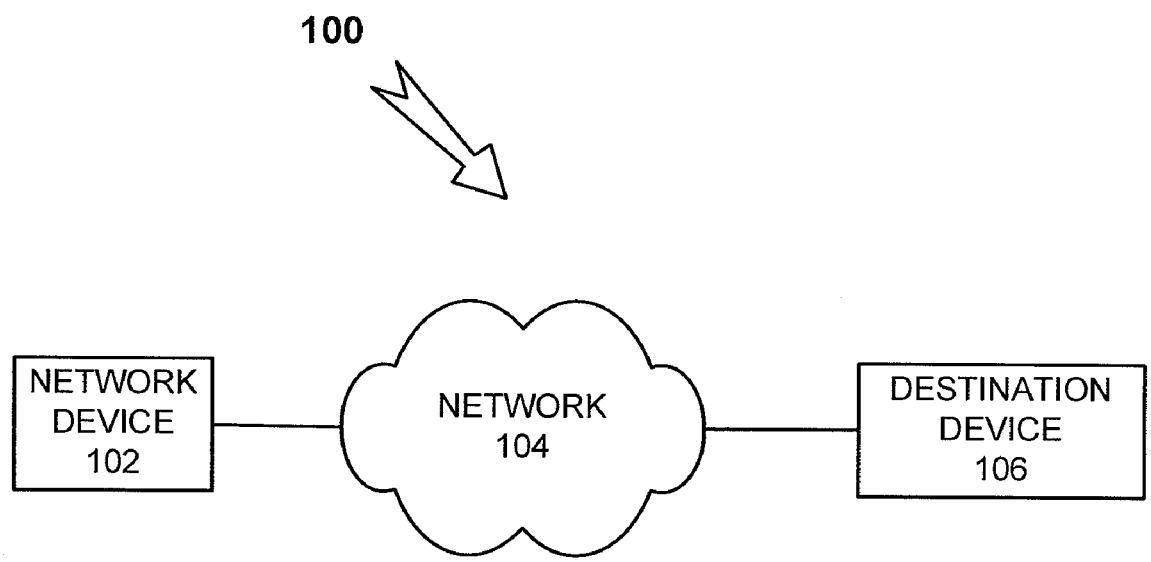
FIG. 1 illustrates an exemplary system that may be used to implement simple shared shaping consistent with principles of the invention.

FIG. 1 illustrates an exemplary system that may be used to implement simple shared shaping consistent with principles of the invention. System 100 may include a network device 102, a network 104 and a destination device 106. Network device 102 may be connected to other devices and may include any device capable of placing data units on a network. For example, network device 102 may include a device, such as a router, a switch, a server, a personal computer, an intrusion detection device, and/or a firewall. "Data unit," as used herein, may refer to any type of machine-readable data having substantially any format that may be adapted for use with network 104. For example, a data unit may include packet and/or non-packet formats.

Network device 102 may receive incoming data units from network 104 and/or another device and may make outgoing data units available to network 104 via an interface. Network device 102 may be configured to perform data unit operations and/or functions such as scheduling, forwarding, and/or switching.

Network 104 may include any type of network capable of receiving a data unit. Network 104 may include a number of network devices, such as routers, switches, gateways and/or databases, for transporting data units from a source device, such as network device 102, to a destination device, such as destination device 106. Network 104 may include physical links for transporting data units from a source to a destination. Physical links may include wired and/or wireless links and/or may include one or more logical interfaces, such as virtual circuits. Network 104 may operate via substantially any network protocol or combination of network protocols, such as Internet Protocol (IP), asynchronous transfer mode (ATM), and/or synchronous optical transport (SONET).

Destination device 106 may include any device capable of receiving a data unit from network 104 and/or transmitting a data unit to network 104. Destination device 106 may include a network device, such as a device similar to network device 102, a desktop computer, a server, a laptop computer, and/or a handheld computing device, such as a personal digital assistant (PDA) and/or web-enabled cellular telephone.

Exemplary Architecture

Figure 2:
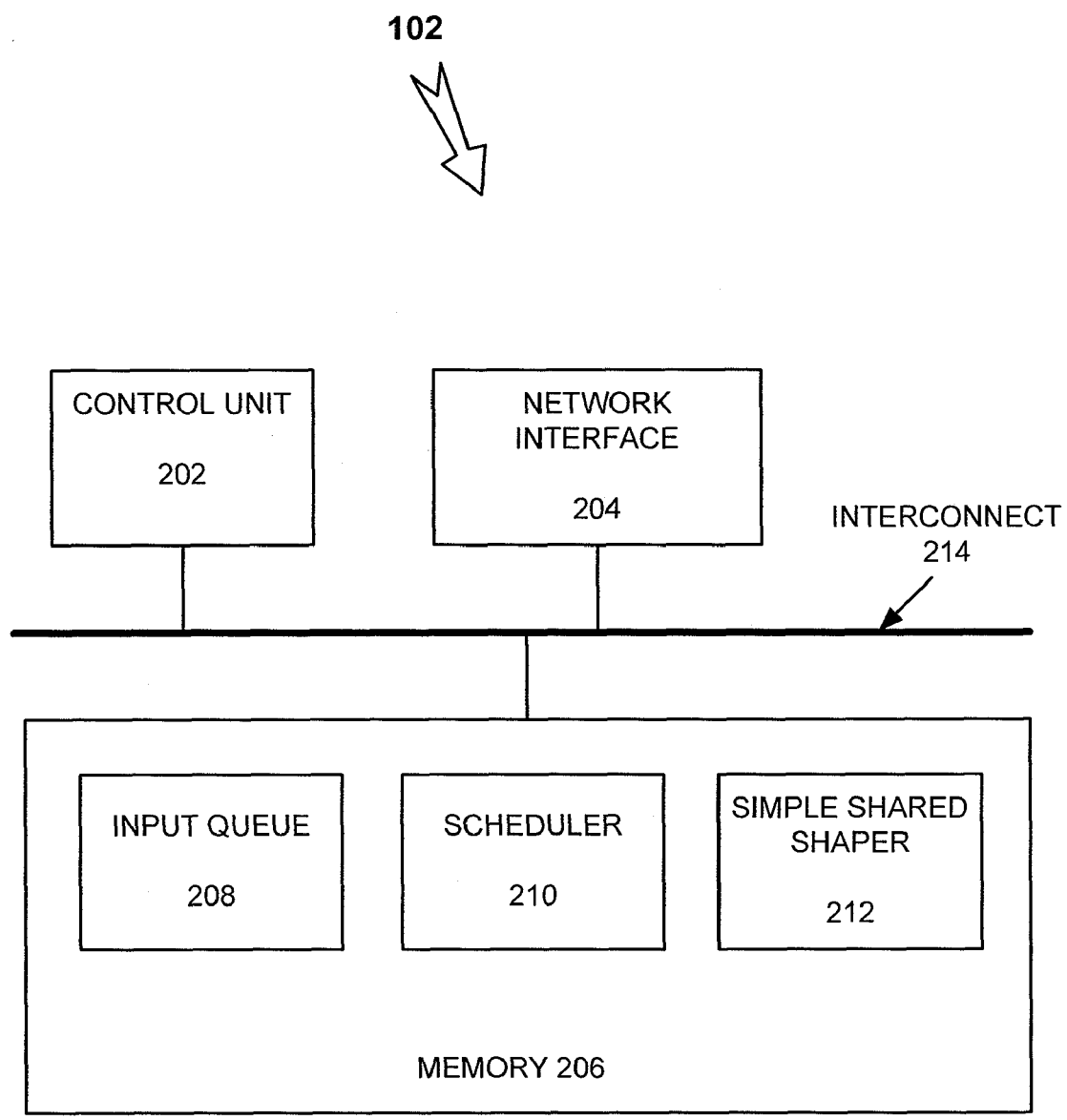
FIG. 2 illustrates an exemplary architecture that may be used in the network device of FIG. 1 to facilitate simple shared shaping consistent with the principles of the invention.

FIG. 2 illustrates an exemplary architecture that may be used in network device 102 to facilitate simple shared shaping consistent with the principles of the invention. The implementation of FIG. 2 may include a control unit 202, a network interface 204, a memory 206 that may include an input queue 208, a scheduler 210, and a simple shared shaper 212, and an interconnect 214.

Control unit 202 may include any type of processor, or microprocessor, or processing logic that interprets and executes instructions. Control unit 202 may be implemented in a standalone and/or a distributed configuration, such as in a parallel processing implementation. Control unit 202 may be implemented as an application specific integrated circuit (ASIC) consistent with the principles of the invention. Control unit 202 may perform high level management functions for network device 102, such as creating data unit forwarding lists, processing simple shared shaper inputs, interacting with scheduler 210, and/or monitoring the status of input queue 208.

Network interface 204 may include any device capable of receiving data units from and/or making data units available to network 104. For example, network interface 204 may receive a data unit from a physical link and may make the data unit available to control unit 202 for processing. Network interface 204 may receive the processed data unit and/or another data unit from control unit 202 and may make the processed data unit available to a physical link associated with network 104. A physical link may include one or more logical interfaces, such as virtual circuits, which may include a group of virtual circuits. A physical link may also include one or more virtual paths. Data units received via network interface 204 may be processed and shaped before network interface 204 makes them available to a link.

Memory 206 may include any device capable of storing information and/or instructions. For example, memory 206 may include a random access memory (RAM) or another type of dynamic storage device that stores information and instructions for execution by control unit 202. Memory 206 may also be used to store temporary variables and/or other intermediate information during execution of instructions by control unit 202. In addition, memory 206 may store incoming data units and/or outgoing data units. Memory 206 may operate in cooperation with other storage devices, such as a magnetic disk or optical storage media and its corresponding drive, for storing information and/or instructions. For example, memory 206 may store instructions that are used to process incoming traffic, information associated with incoming traffic, processed traffic, and queued outgoing traffic prior to making it available to network interface 204.

Input queue 208 may include hardware and/or software for monitoring and/or buffering data traffic flows within network device 102. For example, input queue 208 may include one or more queues for buffering voice traffic, video traffic and/or data traffic. Input queue 208 may operate in conjunction with memory 206. Input queue 208 may operate in conjunction with one or more determined traffic parameters, such as delay and/or jitter. For example, a first input queue associated with voice traffic may operate as a high priority queue according to stringent delay and/or jitter requirements, a second queue associated with video traffic may operate as a medium priority queue with less stringent delay and/or jitter requirements, and a third queue associated with data traffic may operate as a low priority queue having a best effort requirement.

Input queue 208 may operate in conjunction with another queue (not shown), such as a best effort or aggregate queue. A best effort queue may be a queue configured to operate without regard to requirements/priorities associated with portions of the traffic, such as delay and/or jitter requirements/priorities. An aggregate queue may refer to a queue that receives traffic from a number of input sources and/or other queues and manages the received traffic via a single queue.

Scheduler 210 may include hardware and/or software for scheduling data units arriving at network device 102 and/or scheduling the egress of data units from network device 102. Scheduler 210 may operate alone or in cooperation with other scheduling devices and/or techniques, such as a hierarchical scheduler, to forward traffic according to a priority established for a class of traffic, such as voice, video, and/or data traffic. Scheduler 210 may employ aggregate rate information associated with incoming traffic flows and/or queue information to forward traffic via one or more logical interfaces.

Scheduler 210 may operate in conjunction with control unit 202, input queue 208 and/or simple shared shaper 212 to facilitate management of traffic coming into and/or going out of network device 102. For example, incoming data units may arrive at input queue 208 after being received at network device 102 via network interface 204. Incoming data units may be associated with one or more priorities. Scheduler 210 may operate on prioritized data units in conjunction with simple shared shaper 212 to make them available to a physical link via network interface 204. For example, incoming voice data units may be assigned a high priority while data units associated with still images may be assigned a lower priority. Input queue 208 may receive the prioritized incoming data units and may make them available to other devices, such as scheduler 210. Scheduler 210 may operate to empty input queue 208 based on the priorities assigned to the incoming data units.

Simple shared shaper 212 may include software and/or hardware for implementing dynamic traffic shaping of incoming and/or outgoing traffic flows. Dynamic traffic shaping may include prioritizing traffic according to determined parameters, such as delay and/or jitter, and/or low/medium/high priority, and/or may include substantially maintaining an aggregated traffic flow at a predetermined rate. Dynamic traffic shaping may facilitate efficient use and/or reuse of bandwidth associated with network interface 204. Implementations of simple shared shaper 212 may take into account the operating characteristics of other devices, such as a downstream queue, when performing dynamic traffic shaping. For example, simple shared shaper 212 may avoid overrunning the downstream queue by managing the aggregate traffic flow so as not to exceed a throughput rate associated with the downstream queue.

Simple shared shaper 212 may operate on voice, video and/or data traffic associated with input queue 208 so as to maintain an aggregated bandwidth at a determined rate. Simple shared shaper 212 may receive non-aggregated flows, such as voice, video and/or data, and may produce a shaped aggregated flow that represents a combination of the non-aggregated flows. For example, network device 102 may operate to maintain a subscriber's virtual circuit at an aggregate output bandwidth of 10 Mbits/sec. The aggregate bandwidth may be specified to maintain delay/jitter within predetermined limits for high priority traffic, such as voice traffic. This 10 Mbit/sec aggregate bandwidth may be based on an estimated traffic rate of 2 Mbits/sec for high priority voice traffic, 5 Mbits/sec for medium priority video traffic, and 3 Mbits/sec for low priority data traffic. In this example, 2 Mbits/sec, 5 Mbits/sec, and 3 Mbits/sec may represent thresholds, or upper limits, for voice traffic, video traffic, and data traffic, respectively. If voice traffic is operating below its allocated bandwidth at a rate of, for example, 0.5 Mbits/sec, simple shared shaper 212 may allocate the unused high priority bandwidth of 1.5 Mbits/sec among the other traffic flows, such as video and/or data. 1.5 Mbits/sec of voice traffic bandwidth may be dynamically re-allocated so as to maintain the aggregate traffic flow at 10 Mbits/sec on the virtual circuit.

Simple shared shaper 212 may be configured to minimize and/or eliminate overshoots that may occur if a traffic rate exceeds its threshold. Referring to the example used above, voice traffic may be 0.5 Mbits/sec when sampled at a first sampling interval. At a second sampling interval, voice traffic may have increased to 2.5 Mbits/sec. The increase in voice traffic above the 2.0 Mbit/sec threshold may be referred to as an overshoot of 0.5 Mbits/sec. In this case, simple shared shaper 212 may be configured to dynamically reallocate a portion of the video traffic to another traffic flow, such as video and/or data, in order to facilitate maintaining an aggregate traffic flow at a determined rate, such as 10 Mbits/sec.

Exemplary Method

Figure 3:
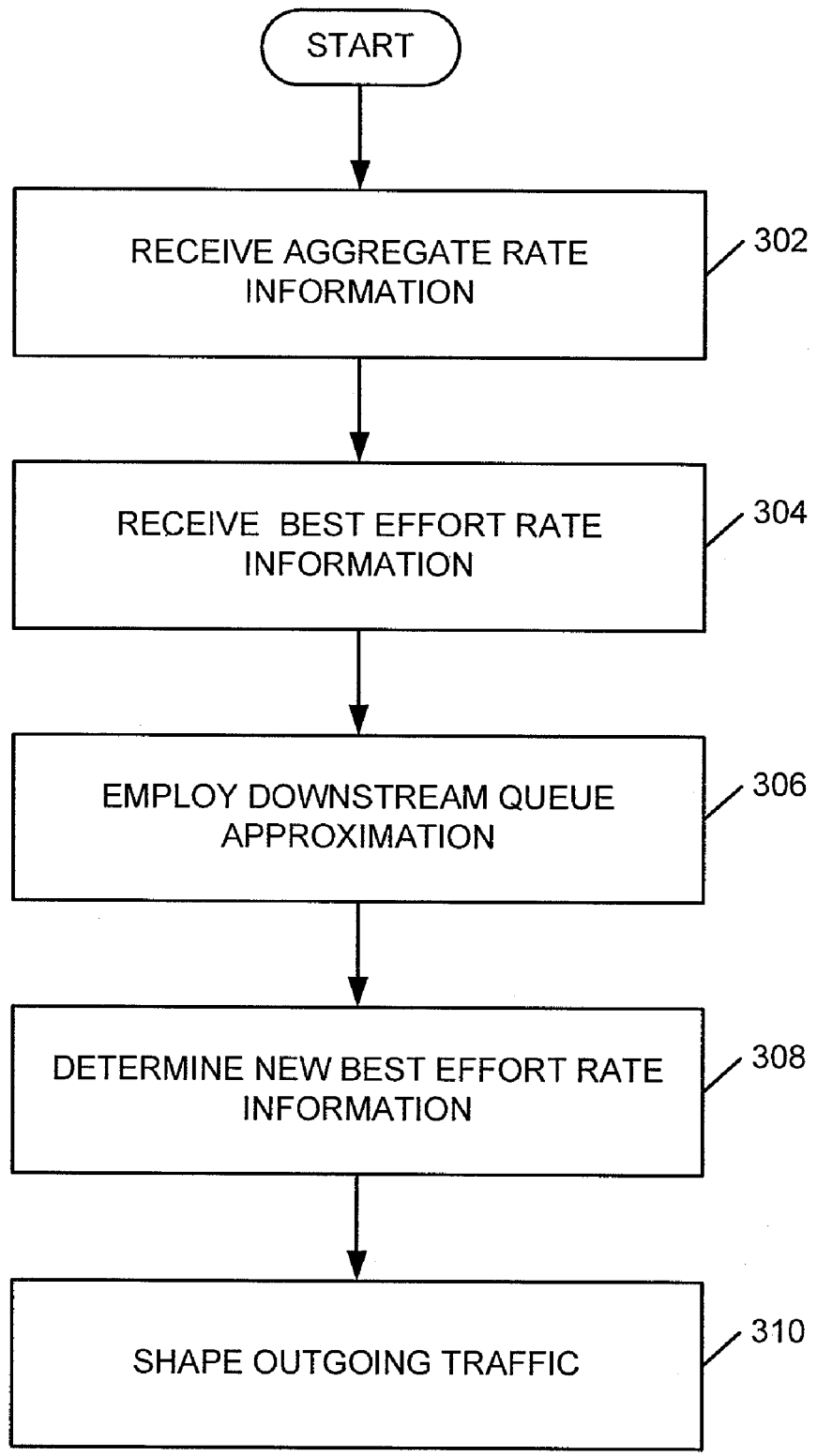
FIG. 3 is a flowchart that illustrates an exemplary method for implementing simple shared shaping consistent with principles of the invention.

FIG. 3 is a flowchart that illustrates an exemplary method for implementing simple shared shaping consistent with principles of the invention. Simple shared shaper 212 may receive aggregate rate information associated with traffic flows, such as voice, video and data traffic (act 302). The aggregate rate information may be new data obtained by sampling one or more queues, such as input queue 208, at a time, t. Aggregate rate information may be obtained at determined intervals via a sampling rate. Sampled queues may be non-best effort queues, such as those including voice and/or video traffic, and/or may be best effort queues, such as those containing data traffic.

Simple shared shaper 212 may receive best effort rate information from memory 206 (act 304). Best effort rate information may include a best effort value associated with a previous sample. For example, the output of simple shared shaper 212 for a given sampling interval may be a best effort rate. A best effort rate for a sampling interval, t, may be used as an input to simple shared shaper 212 for a subsequent sampling interval, such as interval t+1. Best effort rate information may include a representation of the actual best effort rate associated with simple shared shaper 212 at a prior sampling interval. Implementations of simple shared shaper 212 may operate with a single best effort rate value or with multiple best effort rate values. Multiple best effort rate values may be used to adjust reactivity of the shared shaper and its frequency response.

Implementations of simple shared shaper 212 may operate with downstream devices that perform scheduling and/or rate limiting functions. Simple shared shaper 212 may take a parameter, such as the performance, associated with a downstream device into account when shaping traffic flows so that a traffic flow in a queue associated with a downstream device does not exceed a threshold, such as an input traffic flow limit. Increases in queue length may lead to delay, such as a delay associated with the amount of time it takes for a data unit to go from the top of a downstream queue to the bottom of that queue, where the bottom of the downstream queue corresponds to an egress port for the queue. For example, if network device 102 operates in an ATM network, scheduler 210 and/or simple shared shaper 212 may operate with a downstream device having a queue associated therewith, such as a downstream segmentation and reassembly scheduler (SAR). It may be advantageous for simple shared shaper 212 to take the operation of the SAR into account in order to minimize the chances of overrunning the SAR queue, (i.e., filling the SAR queue faster that the queue can drain).

Simple shared shaper 212 may employ a downstream queue approximation to reduce and/or eliminate the risk of overrunning a downstream queue (act 306). An approximation may be used for the downstream queue since no actual communication, or feedback, may exist between simple shared shaper 212 and the downstream device. The downstream queue approximation may be obtained via modeling, network measurements, and/or design parameters, such as by configuring an aggregate queue on network device 102 to match a configuration of a downstream queue associated with, for example, a SAR.

Simple shared shaper 212 may process information and/or approximations to arrive at a new best effort rate value (act 308). For example, simple shared shaper 212 may use non-aggregated flows, such as voice, video and data, best effort rate information from a previous sampling interval, a downstream queue length approximation, and/or a shared shaping rate, to determine the best effort rate value. For example, a shared shaping rate may be provided to simple shared shaper 212 as a constant value.

Simple shared shaper 212 may shape outgoing traffic in a manner that minimizes and/or eliminates overshoots (act 310). For example, if a measured aggregate rate of non-best effort traffic increases from one sampling interval to another, simple shared shaper 212 may operate to reduce the available bandwidth for non-best effort traffic to minimize the chances of overshoot and/or exceeding an allocated bandwidth threshold associated with an interface. In contrast, if an available bandwidth is increasing because an aggregate traffic flow is below a threshold, simple shared shaper 212 may provision additional traffic in a manner that minimizes the potential for overshoot, such as by slightly under-provisioning the additional bandwidth.

The method described in conjunction with FIG. 3 may be implemented in software in one implementation consistent with the principles of the invention. For example, an available best effort shaping rate at a time $t_N$ may be represented as $$\hat{R}_N = \sum_{k=0}^{L} \alpha_k R_{N-k}^{(A)} + \sum_{k=1}^{L} \beta_k R_{N-k} + A_N, \quad \text{(Eq. 1)}$$

with, $$R_N = \max(\hat{R}_N, 0)$$

where $R_N$ equals a best effort shaping rate at time $t_N$, L may represent the number of samples evaluated by simple shared shaper 212, and $R_N^{(A)}$ may represent the estimated maximum available bandwidth at time $t_N$. $R_N^{(A)}$ may be characterized as the difference between the configured shared shaping rate (SSR) and the rate of all traffic flows aggregated into simple shared shaper 212, excluding best effort traffic, averaged over the previous sampling period $R_N^{(M)}$. $R_N^{(A)}$ may be represented as $$R_N^{(A)} = SSR - R_N^{(M)} \quad (Eq.\ 2)$$

$\alpha_k$ and $\beta_k$ may represent weights associated with prior samples. $\alpha_k$ and $\beta_k$ may be time-dependent in implementations of simple shared shaper 212 consistent with the principles of the invention. Implementations of simple shared shaper 212 may employ normalized values for $\alpha_k$ and $\beta_k$, such that $$\sum_{k=0}^{L} \alpha_k \sum_{k=1}^{L} \beta_k = 1 \quad (Eq.\ 3)$$

$\alpha_k$ and $\beta_k$ may be found via simulation, approximation, and/or via traffic measurements performed on network 104.

$A_N$ may represent an adjustment and/or the combination of higher-order corrections to the best effort rate and may be represented as $$A_N = \sum_{k=1}^{L} \gamma_k Q_{N-k} \quad (Eq.\ 4)$$

$$Q_N = \max\left(\sum_{k=-\infty}^{N} q_k, 0\right) = Q_{n-1} + \max(q_N, 0) \quad (Eq.\ 5)$$

and $$q_N = \Delta t \cdot (R_{N-1} - R_N^{(A)}) \quad (Eq.\ 6)$$

$q_N$ may be interpreted as the excess traffic passed through simple shared shaper 212 during the time interval $(t_{N-1}, t_N)$.

Downstream queues, such as a SAR queue, may be configured to match the configured shared shaping rate associated with simple shared shaper 212 so that $Q_N$ may represent an approximation of the downstream queue depth at a time $t_N$. When this occurs, $A_N$ may be an adjustment to the best effort rate based on a current and/or historic length of the downstream queue. Since the length of a downstream queue may be proportional to latency introduced by simple shared shaper 212, $A_N$ may provide coupling of the best effort rate to latency.

An exemplary implementation of simple shared shaper 212, consistent with the principles of the invention, may be implemented with the following parameters, $$L=1, \alpha_0=\tfrac{5}{2}, \alpha_1=-2, \beta_1=\tfrac{1}{2}, \gamma_1=-\tfrac{1}{2}$$

Eq. 1 may be rewritten using the above parameters as $$\hat{R}_N = \tfrac{1}{2}(R_N^{(A)} + R_{N-1}) + 2 \cdot (R_N^{(A)} - R_{N-1}^{(A)}) - \tfrac{1}{2} Q_{N-1} \quad (Eq.\ 7)$$

where the first term of Eq. 7 may represent a mean for the new maximum possible best effort rate based on the latest measured rates through other devices and the previous best effort rate. The first term of Eq. 7 may provide shared shaping in that the best effort traffic may receive at least one half of the currently available bandwidth and the rate will be at least one half of the rate during the previous sampling period. Furthermore, the first term of Eq. 7 may provide protection against sudden changes in the available bandwidth and may dampen high frequency oscillations.

The first term of Eq. 7, operating alone, may not be sufficient to restore latency promptly if an overshoot occurs. The second and third terms of Eq. 7 may compensate to facilitate prompt restoration of latency after an overshoot. The second and third terms of Eq. 7 may further operate on short and long time scales, respectively. The second term of Eq. 7 may operate to boost the best effort rate when the available bandwidth increases, while operating to reduce the best effort rate when the available bandwidth decreases. The third term of Eq. 7 may operate to reduce the best effort rate in the event that the approximated queue length of a downstream device is non-zero.

CONCLUSION

The foregoing description describes implementations of a simple shared shaper that may be configured to shape bandwidth and/or share unused bandwidth among traffic flows having different priorities. The foregoing description of exemplary embodiments of the present invention provides illustration and description, but is not intended to be exhaustive and/or to limit the invention to the precise form disclosed. Modifications and/or variations are possible in light of the above teachings and/or may be acquired from practice of the invention. For example, configurations other than those described may be possible. For example, network device 102 may operate on more than three types of traffic, more or fewer levels and/or classes of traffic, multiple simple shared shapers may operate in series and/or in parallel, and/or simple shared shapers may operate without a downstream queue length approximation.

While series of acts have been described with regard to FIG. 3, the order of the acts is not critical. No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" as used herein is intended to mean "based, at least in part, on" unless explicitly stated otherwise.

The scope of the invention is defined by the following claims and their equivalents.

What is claimed is:

1. a method performed by a network device, the method comprising: allocating, by a control unit of the network device, a portion of an aggregate bandwidth to one of a plurality of traffic classes of traffic entering the network device, the aggregate bandwidth associated with a best effort rate value; determining, by the control unit and without communicating with a downstream device, an approximation of a length of a queue associated with the downstream device; determining, by the control unit, a new best effort rate based on the approximation of the length of the queue associated with the downstream device and the best effort rate value; shaping, by the control unit and based on the new best effort rate, an outgoing traffic flow associated with the network device, the outgoing traffic flow including best effort rate traffic; and allocating, by the control unit and based on the approximation of the length of the queue associated with the downstream device, an unused portion of the aggregate bandwidth to another one of the plurality of traffic classes determined to be exceeding an associated portion of the aggregate bandwidth, the one of the plurality of traffic classes associated with a first priority and the other one of the plurality of traffic classes associated with a second priority, the second priority being a higher priority than the first priority.

2. The method of claim 1, further comprising:
obtaining, by the control unit, aggregate rate information associated with the aggregate bandwidth, the aggregate rate information including a first rate of a traffic flow of the traffic associated with the one of the plurality of traffic classes and a second rate of a traffic flow of the traffic associated with the other one of the plurality of traffic classes; and
where determining the new best effort rate value is further based on the obtained aggregate rate information.

3. The method of claim 2, where obtaining the aggregate rate information, further comprises
sampling an input queue of the network device.

4. The method of claim 1, where determining the approximation of the length of the queue associated with the downstream device, further comprises:
determining the approximation of the length of the queue associated with the downstream device based on a previous approximation of a length of the queue associated with the downstream device.

5. the method of claim 1, where prior to the allocating the unused portion of the aggregated bandwidth, the method further comprises: determining that the other one of the plurality of traffic classes exceeds the associated portion of the aggregate bandwidth.

6. A network device comprising:
one or more queues to:
receive a first class of traffic associated with a first priority, the first priority representing a first quality of service requirement,
receive a second class of traffic associated with a second priority, the second priority representing a second quality of service requirement; and
a control unit to:
allocate, based on the first quality of service requirement represented by the first priority, a first portion of an aggregate bandwidth to the first class of traffic,
allocate, based on the second quality of service requirement represented by the second priority, a second portion of the aggregate bandwidth to the second class of traffic,
determine a best effort rate value associated with the aggregate bandwidth,
determine, without communicating with a downstream device, an approximation of a length of a first queue, of the one or more queues, associated with the downstream device,
determine a new best effort rate value based on the approximation of the length of the first queue and the best effort rate value, and
allocate, based on the approximation of the length of the first queue and the second quality of service represented by the second priority, an unused portion of the first portion of the aggregate bandwidth to the second traffic class, the second traffic class determined to be exceeding the second portion of the aggregate bandwidth.

7. The network device of claim 6, where the control unit is further to:
obtain aggregate rate information that includes a first traffic flow rate associated with the first class of traffic and a second traffic flow rate associated with the second class of traffic, and
where the new best effort rate value is determined further based on the obtained aggregate rate information.

8. The network device of claim 7, where the control unit is further to:
sample the at least one of the one or more queues to obtain the aggregate rate information.

9. The network device of claim 6, where the approximation of the length of the first queue is based on a previous approximation of a length of the first queue.

10. The network device of claim 6, where the control unit is further to:
shape an outgoing traffic flow associated with the network device, based on the new best effort rate value, where the outgoing traffic includes best effort rate traffic, a first traffic flow, and a second traffic flow, where the first traffic flow and the second traffic flow include the first quality of service requirement and the second quality of service requirement, respectively.

11. The network device of claim 6, where prior to the allocation of the unused portion of the first portion of the aggregate bandwidth, the control unit is further to:
determine that the second class of traffic exceeds the second portion of the aggregate bandwidth.

12. The network device of claim 6, where, when determining the new best effort rate value, the control unit is further to:
determine the new best effort rate value further based on an available bandwidth at a current time period and an earlier best effort rate value associated with an earlier time period multiplied by a first coefficient.

13. a system comprising: a network device to: obtain aggregate rate information for network traffic entering the network; identify a first best effort rate value, approximate a downstream queue length associated with a downstream device based on an amount of traffic flow associated with a first traffic class of the network traffic that exceeds a first threshold amount of traffic flow and a prior determination of the downstream queue length, determine a second best effort rate value based on the approximated downstream queue length, the aggregate rate information, and the first best effort rate value, and shape, based on the second best effort rate value, an outgoing traffic flow of the network traffic associated with the network device that includes best effort rate traffic, a first traffic flow associated with the first traffic class, and a second traffic flow associated with the second traffic class, the first traffic flow including a first quality of service requirement associated with the first traffic class, and the second traffic flow including a second quality of service requirement associated with a second quality of service requirement.

14. The system of claim 13, where, when shaping the outgoing traffic flow of the network traffic, the network device is further to:
shape the outgoing traffic flow of the network traffic to maintain an aggregate amount of the outgoing traffic flow at a constant amount of traffic flow.

15. The system of claim 13, where the network device is further to:
sample an input queue of the network device to obtain the aggregate rate information.

16. the system of claim 13, where network device is further to: reallocate, based on the first threshold amount of traffic flow, an unused portion of bandwidth associated with the first traffic class to allow the second traffic class to exceed a second threshold amount of traffic flow.

17. The system of claim 13, where the network device is further to:
determine the second best effort rate value further based on an available bandwidth at a current time period and a third best effort rate value associated with an earlier time period multiplied by a first coefficient.

* * * * *